United States Patent
Dodd (10) Patent No.: US 7,159,066 B2
(45) Date of Patent: Jan. 2, 2007

(54) PRECHARGE SUGGESTION

(75) Inventor: James M. Dodd, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 442 days.

(21) Appl. No.: 10/229,655

(22) Filed: Aug. 27, 2002

(65) Prior Publication Data

US 2004/0044832 A1    Mar. 4, 2004

(51) Int. Cl.
G06F 12/00    (2006.01)
G06F 13/00    (2006.01)

(52) U.S. Cl. .......................... 711/5; 711/105; 711/154

(58) Field of Classification Search ............... 711/100, 711/5, 105, 106, 154, 167; 365/189.01, 203
See application file for complete search history.

(56) References Cited

U.S. PATENT DOCUMENTS

| | | | |
|---|---|---|---|
| 5,390,308 A * | 2/1995 | Ware et al. | 711/5 |
| 5,603,010 A | 2/1997 | Dodd et al. | |
| 5,664,153 A | 9/1997 | Farrell | |
| 5,761,695 A * | 6/1998 | Maeda et al. | 711/5 |
| 6,108,745 A * | 8/2000 | Gupta et al. | 711/3 |
| 6,154,826 A * | 11/2000 | Wulf et al. | 711/217 |
| 6,389,514 B1 | 5/2002 | Rokicki | |
| 6,400,631 B1 | 6/2002 | Williams et al. | |
| 6,401,180 B1 | 6/2002 | Hartmann | |
| 6,505,282 B1 | 1/2003 | Langendorf et al. | |
| 6,507,530 B1 | 1/2003 | Williams et al. | |
| 6,553,449 B1 | 4/2003 | Dodd et al. | |
| 6,697,888 B1 | 2/2004 | Halbert et al. | |
| 6,725,349 B1 | 4/2004 | Langendorf et al. | |
| 6,742,098 B1 | 5/2004 | Halbert et al. | |
| 6,766,385 B1 | 7/2004 | Dodd et al. | |
| 6,785,793 B1 * | 8/2004 | Aboulenein et al. | 711/167 |
| 2003/0182513 A1 | 9/2003 | Dodd et al. | |
| 2004/0015645 A1 | 1/2004 | Dodd et al. | |
| 2004/0042320 A1 | 3/2004 | Dodd et al. | |
| 2004/0088450 A1 | 5/2004 | Dodd et al. | |
| 2004/0158677 A1 | 8/2004 | Dodd | |
| 2004/0243768 A1 | 12/2004 | Dodd et al. | |

FOREIGN PATENT DOCUMENTS

EP    1191444 A    3/2002

OTHER PUBLICATIONS

Pending U.S. Appl. No. 10/676,781, entitled: "Adaptive Page Management", filed Sep. 20, 2003.
Pending U.S. Appl. No. 09/664,981, entitled: "Device and Apparatus for Improving Performance of Low-Cost Memory Devices", filed Sep. 18, 2000.
Pending U.S. Appl. No. 09/664,516, entitled: "System and Method for Controlling Date Flow Direction in a Memory System", filed Sep. 29, 2000.
Pending U.S. Appl. No. 09/677,137, entitled: "Method and Apparatus for Managing Power in a Memory Component While Maintaining High Performance", filed Feb. 29, 2000.

(Continued)

Primary Examiner—Tuan V. Thai
(74) Attorney, Agent, or Firm—Jeffrey B. Huter (57) ABSTRACT

Machine-readable media, methods, and apparatus are described which process memory transactions. In some embodiments, a processor requests an external memory controller to close a storage location of a memory associated with a first memory transaction based upon a relationship between the first memory transaction and a second memory transaction.

32 Claims, 4 Drawing Sheets

OTHER PUBLICATIONS

Pending U.S. Appl. No. 09/666,489, entitled: "Buffering Data Transfer Between a Chipset and Memory Modules", filed Sep. 18, 2000.

B.K. Mathew et al., "Design of a Parallel Vector Access Unit for SDRAM Memory Systems", IEEE Sixth International Symposium on High-Performance Computer Architecture, Jan. 8-12, 2000, Toulouse, France, p. 29-48.

S. Miura et al., "A Dynamic-SDRAM-Mode-Control Scheme for Low-Power Systems With a 32-bit RISC CPU", Proceedings of teh 2001 International Symposium on Low Power Eelctronics and Design, Aug. 6-7, 2001, Huntington Beach, California, p. 358-363.

PCT International Search Report, PCT/US03/26243, mailed Nov. 25, 2005, 9 pages.

* cited by examiner

PRECHARGE SUGGESTION

BACKGROUND

Computing devices typically comprise a processor, memory, and an external memory controller to provide the processor as well as other components of the computing device with access to the memory. The performance of such computing devices is strongly influenced by the "memory read latency" and "memory write latency" of the computing device. In general, the "memory read latency" is the length of time between when the processor requests the external memory controller to retrieve data from the memory and when the external memory controller provides the processor with the requested data. Similarly, the "memory write latency" is generally the length of time between when the processor requests the external memory controller to write data to the memory and when the external memory controller indicates to the processor that the data has been or will be written to the memory.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for processing memory transactions. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing information in a form readable by a machine (e.g., a computing device). For example, a machinereadable medium may include read only memory (ROM); random access memory (RAM); magnetic disk storage media; optical storage media; flash memory devices; and others.

Figure 1:
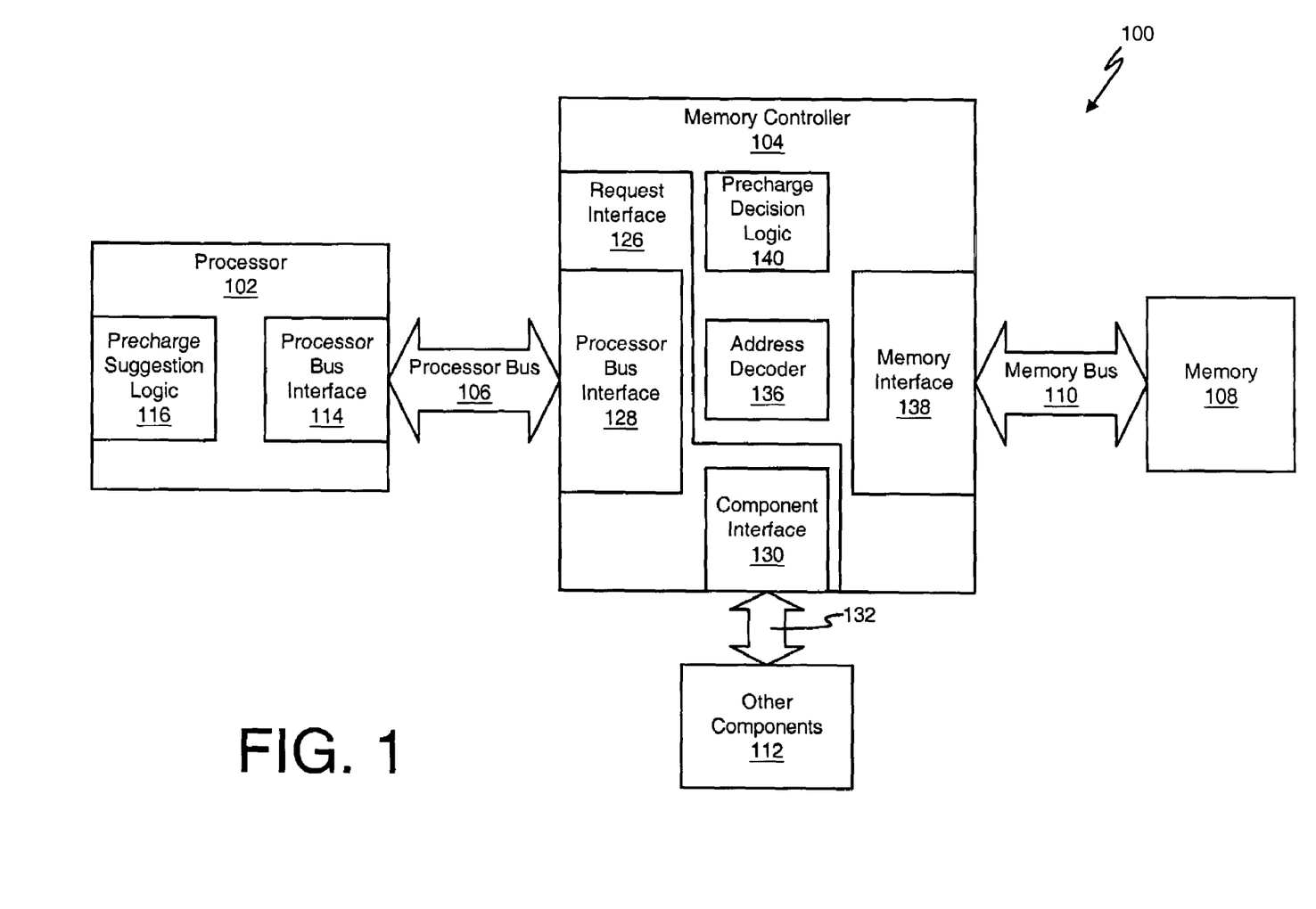
FIG. 1 illustrates an embodiment of a computing device.

An example embodiment of a computing device 100 is shown in FIG. 1. The computing device 100 may comprise a processor 102 coupled to an external memory controller 104 via a processor bus 106. Further, the external memory controller 104 may be coupled to memory 108 via a memory bus 110 to provide the processor 102 and other components 112 (e.g. a mouse, keyboard, video controller, hard disk, floppy disk, firmware, etc.) of the computing device 100 with access to the memory 108.

The processor 102 may comprise a processor bus interface 114 to handle transactions on the processor bus 106. The processor bus interface 114 may issue transactions such as, for example, memory transactions on the processor bus 106. Further, the processor bus interface 114 may respond to and/or track transactions that other bus agents such as, for example, the memory controller 104 and other processors (not shown) issue on the processor bus 106.

The processor 102 may further comprise precharge suggestion logic 116 to generate precharge suggestions. In one embodiment, the precharge suggestion logic 116 may determine based upon pending memory transactions of the processor 102 whether closing open pages 118 of the memory 108 (See, FIG. 2) may be beneficial to memory performance. In response to determining that closing open pages 118 may be beneficial, the precharge suggestion logic 116 may cause the processor bus interface 114 to provide the external memory controller 104 with a precharge suggestion that requests the memory controller 104 close a page 118 of the memory 108.

Figure 2:
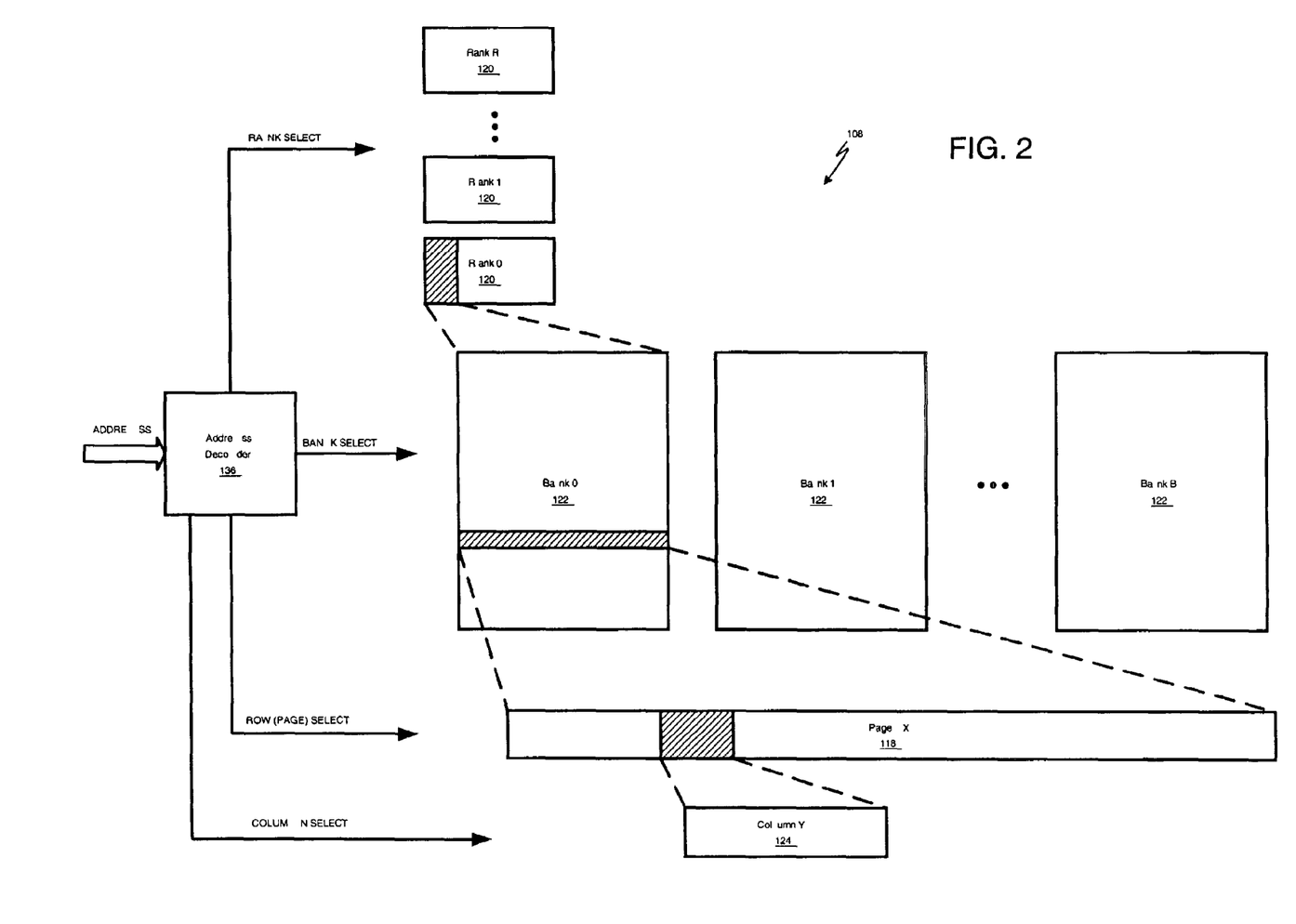
FIG. 2 illustrates an embodiment of a hierarchal memory arrangement of the computing device of FIG. 1.

The memory 108 may comprise various memory devices comprising addressable storage locations that the memory controller 104 may read data from and/or write data to. The memory 108 may comprise one or more different types of memory devices such as, for example, dynamic random access memory (DRAM) devices, synchronous direct random access memory (SDRAM) devices, double data rate (DDR) SDRAM devices, quad data rate (QDR) SDRAM devices, or other memory devices. As shown in FIG. 2, the memory 108 may be arranged in a hierarchal manner. The memory 108 may comprise one or more ranks or channels 120. Each rank 120 may comprise one or more banks 122, and each bank 122 may comprise one or more pages or rows 118. Further, each page 118 may comprise one or more columns 124. In other embodiments, the memory 108 may comprise more or fewer hierarchal levels than depicted in FIG. 2.

The memory controller 104 may comprise a request interface 126 to handle memory requests of the processor 102. In another embodiment, the request interface 126 may further handle memory requests of the other components 112. The request interface 126 may comprise a processor bus interface 128 to communicate directly with the processor 102 via the processor bus 106. The request interface 126 may further comprise component interfaces 130 to communicate directly with the other components 112 via buses 132 such as, for example, peripheral component interconnect (PCI) buses, accelerated graphics port (AGP) buses, universal serial bus (USB) buses, low pin count (LPC) buses, and/or other I/O buses. In other embodiments, the request interface 126 communicates indirectly with the processor 102 and the components 112 via a processor bus interface 128 and component interfaces 134 of a chipset (not shown) that may comprise one or more packaged integrated circuit devices.

The memory controller 104 may further comprise an address decoder 136 to decode an address of a memory request. The address decoder 136 may decode the address of a memory request to generate one or more selects that correspond to the hierarchal arrangement of the memory 108 and that may be used to select or address a particular storage location of the memory 108. In one embodiment, the address decoder 136 may determine a rank select, bank select, page select, and a column select that respectively select a rank 120, bank 122, page 118, and column 124 of the memory 108. (See, FIG. 2.)

The memory controller 104 may further comprise a memory interface 138 coupled to the memory bus 110. The memory interface 138 may apply one or more selects such as, for example, the rank select, bank select, and page select to the memory bus 110 to open the page 118 of memory 108 associated with the memory request. The memory interface 138 may further apply one or more selects such as, for example, the column select to the memory bus 110 to select the column 124 of the opened page 118 for reading and writing.

The memory controller 104 may further comprise precharge decision logic 140 to determine whether to close open pages 118 of the memory 108. In one embodiment, the precharge decision logic 140 determines whether to close an open page based upon precharge suggestions received from the processor 102. The precharge decision logic 140 may also determine whether to close an open page 118 based further upon decoded addresses of memory requests received from the processor and/or the components 112. The precharge decision logic 140 may utilize different algorithms to improve aspects of memory performance such as reducing memory latency and/or increasing memory bandwidth. Generally, such algorithms attempt to increase the number of "page-hit" accesses and/or reduce the number of "page-miss" accesses that occur and attempt to do better than a "page-empty" algorithm that closes pages 118 of the memory 108 after every access.

A page-hit access occurs in response to a memory request accessing an open page 118 that was opened for a previous memory request. For a page-hit access, the memory controller 104 may leave the page 118 open after accessing a column 124 of the page 118 for the previous memory request and may access a different column 124 of the open page 118 for the current memory request. A page-miss access occurs in response to a memory request accessing a closed page 118 of a bank 122 that has another page 118 opened. For a page-miss access, the memory controller 104 closes the open page 118 of the bank 122, opens another page 118 of the bank 122, and accesses a column 124 of the newly opened page 118 for the current memory request. A page-miss access generally has about three times the latency as a page-hit access. A page-empty access occurs in response to a memory request accessing a closed page 118 of a bank 122 that has no pages 118 that are opened. For a page-empty access, the memory controller 104 opens a closed page 118 of the bank 122, and accesses a column 124 of the newly opened page 118 for the memory request. A page-empty access generally has about twice the latency as a page-hit access.

Figure 3:
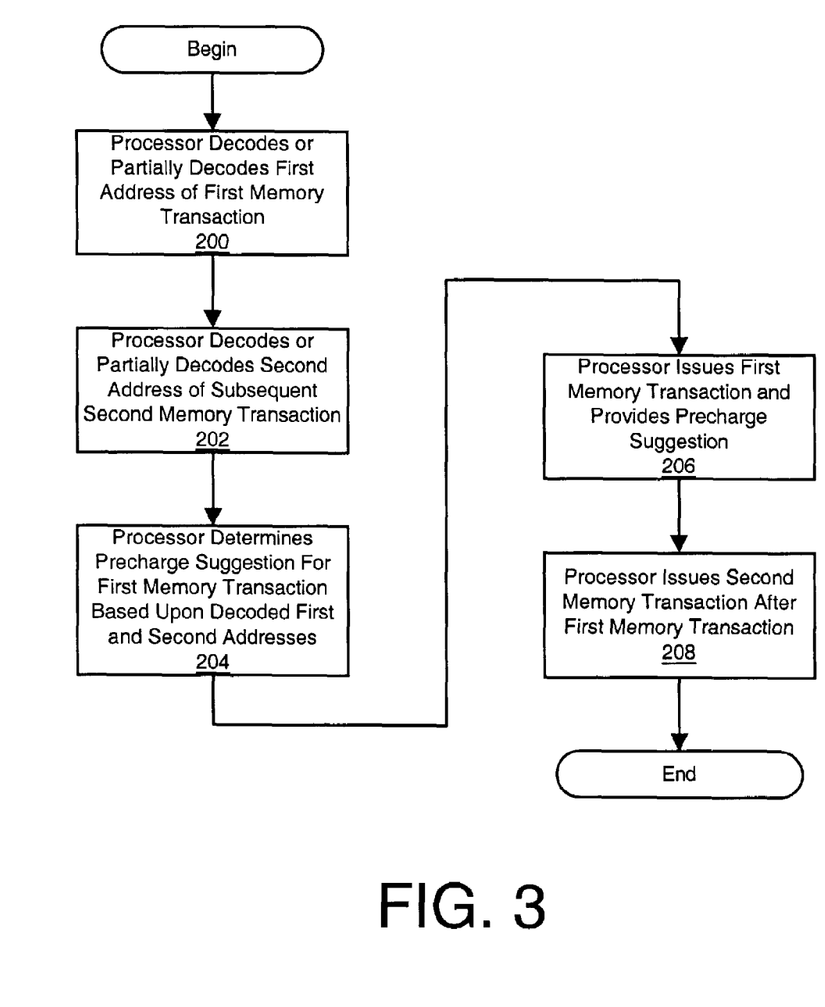
FIG. 3 illustrates an embodiment of a method that may be used by the processor of FIG. 1 to provide the external memory controller with precharge suggestions.

Shown in FIG. 3 is an embodiment of a method that may be used by the processor 102 to provide the memory controller 104 with precharge suggestions. In block 200, the precharge suggestion logic 116 of the processor 102 may decode or partially decode a first address of a first memory transaction. In one embodiment, the precharge suggestion logic 116 decodes or partially decodes a first physical address of the first memory transaction to obtain a first physical rank select, a first physical bank select, and/or a first physical page select. The computing device 100 in some embodiments may support virtual addressing in which the processor 102 uses virtual addresses to access storage locations of the memory 108. The processor 102 and/or memory controller 104 may translate or otherwise map the virtual addresses to physical addresses that are ultimately decoded to access storage locations of the memory 108. In such virtual addressing embodiments, the precharge suggestion logic 116 may decode or partially decode a first virtual address of the first memory transaction instead of a first physical address to obtain a first virtual rank select, a first virtual bank select, and/or a first virtual page select.

In block 202, the precharge suggestion logic 116 may decode or partially decode a second address of a second memory transaction that follows the first memory transaction. In one embodiment, the precharge suggestion logic 116 decodes or partially decodes a second physical address of the second memory transaction to obtain a second physical rank select, a second physical bank select, and/or a second physical page select. In virtual addressing embodiments, the precharge suggestion logic 116 may decode or partially decode a second virtual address of the second memory transaction instead of a second physical address to obtain a second virtual rank select, second virtual bank select, and/or a second virtual page select.

The precharge suggestion logic 116 in block 204 may determine a precharge suggestion for the first memory transaction based on various different algorithms. For example, the precharge suggestion logic 116 may be implemented with a default close algorithm in which the precharge suggestion logic 116 generates a precharge suggestion that requests the memory controller 104 to close a page 118 of the memory 108 in response to determining that predetermined open criteria are not satisfied. Conversely, the precharge suggestion logic 116 may be implemented with a default open algorithm in which the precharge suggestion logic 116 generates a precharge suggestion that requests the memory controller 104 to leave a page 118 of the memory 108 open in response to determining that predetermined close criteria are not satisfied. In yet other embodiments, the precharge suggestion logic 116 may be implemented with an affirmative algorithm in which the precharge suggestion logic 116 generates a precharge suggestion that requests the memory controller 104 to close a page 118 in response to determining that predetermined close criteria have been satisfied, generates a precharge suggestion that requests the memory controller 104 to leave a page 118 open in response to determining that predetermined open criteria have been satisfied, and provides no precharge suggestions in response determining that neither the predetermined close criteria nor the predetermined open criteria have been satisfied. By providing no precharge suggestion, the precharge suggestion logic 116 may defer to the precharge decision logic 140 of the memory controller 104 to make the precharge determination.

In one embodiment, the precharge suggestion logic 116 determines whether the first memory transaction and second memory transaction are directed to the same page 118 of memory 108 based upon the decoded first address and the decoded second address. For example, if the rank selects, bank selects, and page selects of the first memory transaction and the second memory transaction are equal, the precharge suggestion logic 116 may determine that the transactions are directed to the same page 118 of memory 108 and may provide the processor bus interface 114 with a precharge suggestion that requests the memory controller 104 to leave the page 118 open after accessing the page 118 for the first memory transaction. By leaving the page 118 open, the second memory transaction is likely to result in a page-hit access which helps reduce the average latency of memory transactions.

In another embodiment, the precharge suggestion logic 116 determines whether the first memory transaction and second memory transaction may result in a page-miss access based upon partial decodes of the first address of the first memory transaction and the second address of the second memory transaction. In particular, the precharge suggestion logic 116 may determine whether the first memory transaction and second memory transaction may result in a page-miss based upon rank selects, bank selects, page selects, or combinations of rank selects, bank selects, a page selects. For example, the precharge suggestion logic 116 may determine that the second memory transaction is likely to result in a page-miss if the page selects of the first memory transaction and the second memory transaction are different without determining rank selects and/or bank selects for the memory transactions. Conversely, the precharge suggestion logic 116 may determine that the second memory transaction is likely to result in a page-hit if the page selects of the first memory transaction and the second memory transaction are the same without determining rank selects and/or bank selects for the memory transactions.

In yet another embodiment, the precharge suggestion logic 116 determines whether one or more memory transactions that follow a first memory transaction are directed to the same page 118 as the first memory transaction based upon selects of the first memory transaction and the selects of the one or more subsequent memory transactions. For example, the precharge suggestion logic 116 may determine based upon selects for four memory transactions that follow the first memory transaction that none of the four subsequent memory transactions are directed to the same page 118 as the first memory transaction. In response to determining that none of the four subsequent memory transactions are directed to the same page 118 as the first memory transaction, the precharge suggestion logic 116 may provide the external memory controller 104 with a precharge suggestion that requests that the page 118 be closed after processing the first memory transaction.

In block 206, the processor 102 issues the first memory transaction on the processor bus 106 and provides the memory controller 104 with a precharge suggestion for the first memory transaction. In one embodiment, the processor bus interface 102 generates signals on the processor bus 106 that request the memory controller 104 to process the first memory transaction and that provide the memory controller 104 with the precharge suggestion for the first memory request. In another embodiment, the processor bus interface 114 provides the precharge suggestion during a transaction type phase of the first memory transaction. In yet another embodiment, the processor bus interface 114 provides the precharge suggestion during an address phase of the first memory transaction. In other embodiments, the processor bus interface 106 provides the memory controller 104 with the precharge suggestion via a side-band bus (not shown) that is separate from the processor bus 106. It should be appreciated, however, that the processor 102 may provide the memory controller 104 with the precharge suggestion via other techniques such as, for example, other phases of the first memory transaction, a separate bus transaction that precedes the first memory transaction, or a separate bus transaction that follows the first memory transaction.

The processor 102 in block 208 may issue the second memory transaction on the processor bus 106 after the first memory transaction. Further, the processor 102 may provide the memory controller 104 with a precharge suggestion for the second memory transaction based upon a third memory transaction that follows the second memory transaction.

It should be appreciated that the second memory transaction may not in fact result in the likely accesses indicated above due to various reasons. For example, the memory controller 104 may elect to either close or open the page 118 based upon criteria in addition to the precharge suggestion received from the processor 102. For example, the memory controller 104 may elect to close the page 118 and process another memory transaction from another processor (not shown) or component 112 between the memory transaction and the second memory transaction. Further, the memory controller 104 and or memory 108 may elect to close the page 118 and dynamically refresh the page 118 or other pages 118 of the memory 108 between the memory transaction and the second memory transaction.

Figure 4:
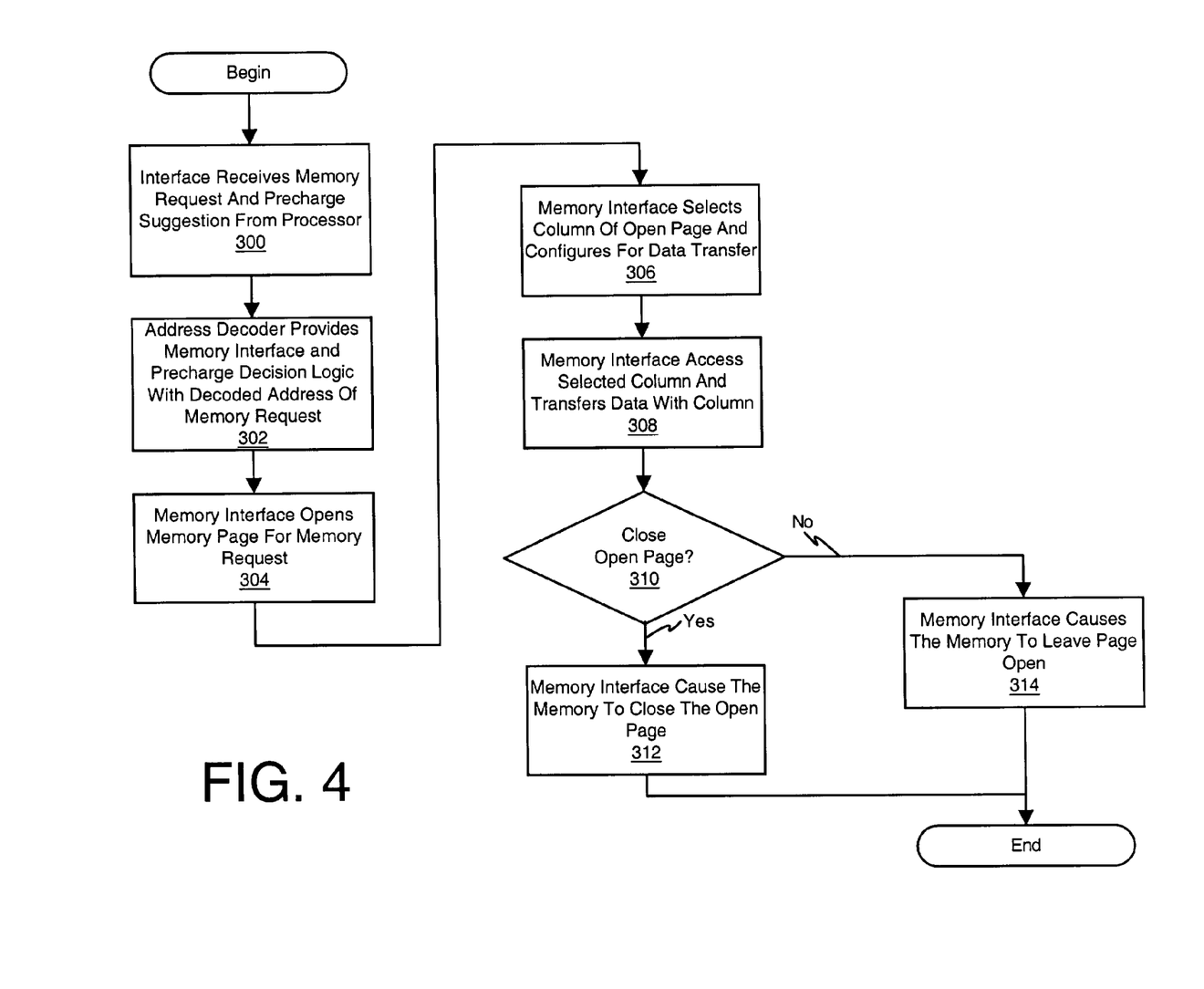
FIG. 4 illustrates an embodiment of a method that may be used by the memory controller of FIG. 1 to process a memory request based upon an associated precharge suggestion received from the processor.

Referring now to FIG. 4, there is depicted a method that may be used by the memory controller 104 to process a memory request. In block 300, the request interface 126 of the memory controller 104 may receive a memory request from the processor 102 that comprises an address and a precharge suggestion. In one embodiment, the processor bus interface 128 receives the address and the precharge suggestion of the memory request via a memory transaction of the processor bus 106. However, as indicated above in regard to FIG. 3, the precharge suggestion may be provided to the memory controller 104 via other techniques such as, for example, signals on a side-band bus or a separate transaction on the processor bus 106.

The address decoder 136 in block 302 may decode the address of the memory request to obtain a decoded address comprising one or more memory selects. In one embodiment, the address decoder 136 may generate from the address a decoded address comprising a rank select, a bank select, a page select, and a column select and may provide the precharge decision logic 140 and the memory interface 138 with the decoded address. In another embodiment, the address decoder 136 may provide the precharge decision logic 140 with a partially decoded address comprising only a portion of the one or more generated memory selects such as, for example, only a page select.

In response to memory controller 104 selecting the memory request for processing, the memory interface 138 in block 304 may generate page address signals on the memory bus 110 that open a page 118 of the memory 108. In one embodiment, the memory interface 138 may generate page address signals that comprise a row address strobe (RAS) and the rank select, bank select, and page select associated with the memory request. In response to the row address signals, the memory 108 may open a page 118 of the memory 108 that is associated with the rank select, bank select, and page select.

The memory interface 138 in block 306 may further generate column address signals and command address signals on the memory bus 110 that select a column 124 of the opened page 118 for a data transfer. In one embodiment, the memory interface 138 may generate column address signals that comprise a column address strobe (CAS) and the column select associated with the memory request. In response to the column address signals, the memory 108 selects a column 124 of the opened page 118 that is associated with the memory request. Further, the memory interface 138 in block 306 may generate command signals on the memory bus 110 that configure the selected column for a data transfer. For example, the memory interface 138 may generate an active output enable (OE) signal to cause the selected column 124 to provide the memory interface 138 with data stored in the selected column 124. Similarly, the memory interface 138 may generate an inactive OE signal to cause the selected column 124 to receive data provided by the memory interface 138.

The memory interface 138 in block 308 may access the selected column 124 to transfer data between the memory interface 138 and the selected column 124. In one embodiment, the memory interface 138 may write data to the selected column 124 by generating data signals on the memory bus 110 that comprise the data to be written and a data strobe. Similarly, the memory interface 138 may generate read data from the selected column 124 in response to receiving data signals on the memory bus 110 that comprise data from the selected column 124 and a data strobe from the memory 108.

In block 310, the precharge decision logic 140 of the memory controller 104 may determine whether to close the page 118 associated with the memory request based upon the precharge suggestion associated the memory request. In one embodiment, the precharge decision logic 140 determines that the memory interface 138 is to close the page 118 unless the precharge suggestion requests that the page 118 remain open. In another embodiment, the precharge decision logic 140 determines that the memory interface 138 is to leave the page 118 open unless the precharge suggestion requests that the page 118 be closed.

In yet another embodiment, the precharge decision logic 140 may further base its decision upon other information such as, for example, the decoded or partially decoded address of the memory request and/or the decoded or partially decoded address of other pending memory requests. As a result of the additional information, the precharge decision logic 140 may choose to leave a page 118 open that the precharge suggestion requested be closed and/or the precharge decision logic 140 may choose to close a page 118 that the precharge suggestion requested be left open.

For example, the memory controller 104 may have pending memory requests received from other components 112 or other processors (not shown) of the computing device 100. The precharge decision logic 140 in block 310 may determine to leave the page 118 associated with the memory request open until after the another pending memory request has been processed despite the precharge suggestion requesting that the page 118 be closed. Similarly, the precharge decision logic 140 in block 310 may determine to close the page 118 associated with the memory request despite the precharge suggestion requesting that the page 118 remain open in response to determining that memory interface 138 is to initiate a dynamic refresh of the page 118 or other pages 118 of the memory 108 after processing the memory request.

In response to determining to close the page 118, the memory interface 138 in block 312 may cause the memory 108 to close the selected page 118. In one embodiment, the memory interface 138 may generate precharge command signals on the memory bus 110 which cause the memory 108 to close the page 118. In general, the precharge command signals result in the memory 108 closing the page 118 after the column 124 is accessed for the memory request, after processing of the memory request is completed, and/or prior to the memory interface 138 processing a subsequent memory request received from the processor 102. In general, the timing and the manner of generating the precharge command signals is dependent upon the implementation of the memory 108. For example, in one embodiment, the memory interface 138 may generate the precharge command signal by inactivating the RAS of the first row address signals associated with the memory request at an appropriate time such as, for example, after the data signals have been transferred or possibly even sooner for some memory implementations. In another embodiment, the memory interface 138 may provide the precharge command as part of the command signals generated by the memory interface 138 in block 306 to cause the memory 108 to close the open page 118 after transferring data between the memory interface 138 and a later selected column 124.

In response to determining to leave the page 118 open, the memory interface 138 in block 314 may further cause the memory 108 to leave the selected page 118 open. In one embodiment, the memory interface 138 may generate no precharge command signals or may generate page-open command signals on the memory bus 110 which cause the memory 108 to leave the page 118 open. In one embodiment, the absence of precharge command signals result in the memory 108 leaving the page 118 open until precharge command signals are received or a different page 118 of the memory 108 is opened. In another embodiment, the memory 108 closes the page 118 after the column 124 is accessed for the memory request, after the memory request is completed, and/or prior to the memory interface 138 processing a subsequent memory request unless the memory interface 138 provides the memory 108 with page-open command signals at an appropriate time. In general, the timing and the manner of generating the page-open command signals is dependent upon the implementation of the memory 108. For example, in one embodiment, the memory interface 138 may generate the page-open command signals by maintaining the RAS of the row address signals in an active state. In another embodiment, the memory interface 138 may provide the page-open command as part of the command signals generated by the memory interface 138 in block 306 to cause the memory 108 to leave the page 118 open after transferring data between the memory interface 138 and a later selected column 124.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A computer implemented method comprising:
   determining that a first memory transaction and a second memory transaction are directed to a same memory bank and to different pages of the same memory bank; and
   closing a first page to which the first memory transaction is directed in response to processing the first memory transaction when a closing request is sent to a memory controller via a bus external to the memory controller.

2. The method of claim 1 wherein determining comprises:
   decoding a first address of the first memory transaction to obtain a first bank select and a first page select;
   decoding a second address of the second memory transaction to obtain a second bank select and a second page select; and
   determining that the first bank select and the second bank select are directed to the same memory bank and that the first page select and the second page select are directed to different pages of the same memory bank.

3. The method of claim 1 wherein determining comprises:
   decoding a first address of the first memory transaction to obtain a first rank select, a first bank select, and a first page select;
   decoding a second address of the second memory transaction to obtain a second rank select, a second bank select, and a second page select; and
   determining that the first bank select and the second bank select are directed to the same memory bank and that the first page select and the second page select are directed to different pages of the same memory bank.

4. The method of claim 1 further comprising:
   providing the memory controller with a first memory request that requests the memory controller to process the first memory transaction and that requests the memory controller to close the first page after processing the first memory transaction; and
   providing the memory controller with a second memory request after the first memory request that requests the memory controller to process the second memory transaction.

5. The method of claim 1 further comprising:
   providing the memory controller with a first memory request that requests the memory controller to process the first memory transaction and that requests the memory controller to close the first page before processing the second memory transaction; and
   providing the memory controller with a second memory request that requests the memory controller to process the second memory transaction.

6. The method of claim 1 further comprising:
   requesting the memory controller to process the first memory transaction and to close the first page after processing the first memory transaction; and
   requesting the memory controller to process the second memory transaction after requesting the memory controller to process the first memory transaction.

7. The method of claim 1 further comprising:
   requesting the memory controller to process the first memory transaction and to close the first page before processing the second memory transaction; and
   requesting the memory controller to process the second memory transaction.

8. A computer implemented method comprising:
   determining whether a first memory transaction has a predetermined relationship to one or more memory transactions that are to be processed after the first memory transaction; and
   precharging a memory device used to satisfy the first memory transaction in response to determining that the first memory transaction has the predetermined relationship to the one or more memory transactions when a request is sent to a memory controller via a bus external to the memory controller.

9. The method of claim 8 further comprising:
   requesting the memory controller not to precharge the memory device used to satisfy the first memory transaction in response to determining that the first memory transaction does not have the predetermined relationship to the one or memory transactions.

10. The method of claim 8 wherein determining comprises:
    determining a first page select from a first address of the first memory transaction;
    determining second page selects from addresses of the one or more memory transactions; and
    determining that the first transaction has the predetermined relationship to the one or more memory transactions in response to the first page select having a predetermined relationship with the second page selects.

11. The method of claim 8 wherein determining comprises:
    determining a first page select from a first physical address of the first memory transaction;
    determining second page selects from physical addresses of the one or more memory transactions; and
    determining that the first transaction does not have the predetermined relationship to the one or more memory transactions in response to the first page select having a predetermined relationship with the second page selects.

12. The method of claim 8 wherein determining comprises determining that the first memory transaction does not have the predetermined relationship to the one or more memory transactions in response to the first memory transaction and at least one of the one or more memory transactions being directed to the same page.

13. For use with a processor and a memory, a method comprising:
    receiving a first memory request from the processor that is directed to a first page of memory;
    receiving a precharge suggestion from the processor that requests the first page of memory be closed after processing the first memory request;
    opening the first page of memory to process the first memory request; and
    closing the first page of memory in response to the precharge suggestion.

14. The method of claim 13, further comprising:
    receiving a second memory request from a component other than the processor; and
    determining to close the first page based upon the precharge suggestion and the second memory request.

15. The method of claim 13, further comprising:
    receiving a second memory request from the processor after receiving the first memory request; and
    processing the second memory request after closing the first page of memory.

16. For use with an external memory controller coupled to a memory, a processor comprising:
- precharge suggestion logic to generate a precharge suggestion that requests a first page associated with a first memory transaction be closed in response to determining that the first memory transaction has a predetermined relationship to one or more subsequent memory transactions; and
- a hardware interface to provide the external memory controller with the first memory transaction and the precharge suggestion.

17. The processor of claim 16 wherein the precharge suggestion logic is to generate the precharge suggestion to request that the first page remain open in response to determining that the first memory transaction does not have the predetermined relationship to the one or more subsequent memory transactions.

18. The processor of claim 16 wherein the precharge suggestion logic is to determine that the first memory transaction has the predetermined relationship to the one or more subsequent memory transactions in response to determining that none of the one or more subsequent memory transactions are directed to the same page as the first memory transaction.

19. The processor of claim 16 wherein the precharge suggestion logic is to determine that the first memory transaction has the predetermined relationship to the one or more subsequent memory transactions in response to determining that none of the one or more subsequent memory transactions are directed to the same bank as the first memory transaction.

20. The processor of claim 16 wherein the precharge suggestion logic is to determine that the first memory transaction has the predetermined relationship to the one or more subsequent memory transactions in response to determining that none of the one or more subsequent memory transactions are directed to the same rank as the first memory transaction.

21. For use with a processor and a memory, a memory controller
comprising
- a first interface to receive from the processor a first memory request and a first suggestion indicating whether the processor requested that the memory be precharged, and to receive from the processor a second memory request after the first memory request;
- precharge decision logic to determine, based at least in part upon the first suggestion, whether the memory is to be precharged; and
- a second interface to access a first storage location of the memory for the first memory request, and to precharge the memory prior to processing the second memory request in response to the precharge decision logic determining that the memory is to be precharged.

22. The memory controller of claim 21, further comprising
- an address decoder to generate one or more first memory selects based upon a first address of the first memory request, and to generate one or more second memory selects based upon a second address of the second memory request, wherein:
- the precharge decision logic is to determine whether the memory is to be precharged based further upon the one or more first memory selects and the one or more second memory selects.

23. The memory controller of claim 22, further comprising a third interface to receive a third memory request from a component other than the processor, wherein:
- the precharge decision logic is to determine whether the memory is to be precharged based further upon the third memory request.

24. A computing device comprising
dynamic random access memory comprising pages;
- a processor to generate a precharge suggestion for a first memory transaction, and to issue the first memory transaction and the precharge suggestion on a processor bus; and
- a memory controller, external to the processor, that is coupled to the dynamic random access memory via a memory bus and to the processor via the processor bus, the memory controller to receive the first memory transaction and the precharge suggestion from the processor bus, to open a first page of the dynamic random access memory that is addressed by the first memory transaction, and to close the first page of the dynamic random access memory based at least in part upon the precharge suggestion.

25. The computing device of claim 24, wherein the processor is to further issue a second memory transaction on the processor bus after issuing the first memory transaction, and is to generate the precharge suggestion for the first memory transaction based upon a predetermined relationship between the first memory transaction and the second memory transaction.

26. The computing device of claim 25, wherein:
- the pages of the dynamic random access memory are addressed by at least page selects; and
- the processor is to determine a first page select for the first memory transaction and a second page select for the second memory transaction, and is to generate the precharge suggestion to request that a first page addressed by the first memory transaction be closed in response to the first page select and the second page select being different.

27. The computing device of claim 25, wherein:
- the pages of the dynamic random access memory are addressed by at least bank selects and page selects; and
- the processor is to determine a first bank select and a first page select for the first memory transaction and a second bank select and a second page select for the second memory transaction, and is to generate the precharge suggestion to request that a first page addressed by the first memory transaction remain open in response to the first bank select and the second bank select being equal, and the first page select and the second page select being equal.

28. The computing device of claim 25, wherein:
- the pages of the dynamic random access memory are addressed by at least bank selects and page selects; and
- the processor is to determine a first bank select and a first page select for the first memory transaction and a second bank select and a second page select for the second memory transaction, and is to generate the precharge suggestion to request that a first page addressed by the first memory transaction be closed in response to the first bank select and the second bank select being equal and the first page select and the second page select being equal.

29. The computing device of claim 25, wherein:
- the pages of the dynamic random access memory are addressed by at least rank selects, bank selects, and page selects; and the processor is to determine a first rank select, a first bank select and a first page select for the first memory transaction, is to determine a second rank select, a second bank select and a second page select for the second memory transaction, and is to generate the precharge suggestion to request that a first page addressed by the first memory transaction be closed in response to the first rank select and the second rank select being equal, the first bank select and the second bank select being equal and the first page select and the second page select being different.

30. A tangible machine readable medium comprising instructions that in response to being executed result in a processor to:

determining whether a first memory transaction that addresses a first storage location of a memory has a predetermined relationship to a second memory transaction that addresses a second storage location of the memory; and precharging the memory after accessing the first memory page if the first memory transaction has the predetermined relationship to the second memory transaction when a memory controller external to the processor is requested to access the first storage location for the first memory transaction.

31. The tangible machine readable medium of claim 30 wherein the instructions further result in the processor requesting the memory controller to access the second memory page for the second memory transaction after accessing the first storage location for the first memory transaction.

32. The tangible machine readable medium of claim 30 wherein the instructions further result in the processor requesting the memory controller to refrain from precharging the memory if the first memory transaction does not have the predetermined relationship to the second memory transaction.

* * * * *